United States Patent [19]
Betts et al.

[11] Patent Number: 4,796,279
[45] Date of Patent: Jan. 3, 1989

[54] SUBRATE PREAMBLE DECODER FOR A HIGH SPEED MODEM

[75] Inventors: William L. Betts, Madeira Beach; Kenneth Martinez, Pinellas Park, both of Fla.

[73] Assignee: Paradyne Corporation, Largo, Fla.

[21] Appl. No.: 68,733

[22] Filed: Jun. 30, 1987

Related U.S. Application Data

[63] Continuation of Ser. No. 680,377, Dec. 11, 1984, abandoned.

[51] Int. Cl.$^4$ .......................... H04L 5/12; H04B 1/38
[52] U.S. Cl. ....................................... 375/39; 375/8; 375/13; 375/84; 340/825.21; 340/825.58; 329/120
[58] Field of Search ...................... 375/8, 9, 13, 39, 84, 375/85; 329/120, 137; 307/513; 370/92; 455/38; 340/825.14, 825.21, 825.44, 825.48, 825.58, 825.70

[56] References Cited

U.S. PATENT DOCUMENTS

| 3,978,407 | 8/1976 | Forney, Jr. et al. | 375/13 |
| 3,993,956 | 11/1976 | Gilmore et al. | 375/84 |
| 4,034,305 | 7/1977 | Sato | 375/39 |
| 4,245,345 | 1/1981 | Gitlin et al. | 375/13 |
| 4,308,618 | 12/1981 | Levy et al. | 375/15 |

OTHER PUBLICATIONS

"10.2 Digital Modulation", *Communication Systems*, Carlson, McGraw-Hill, 1975, pp. 389–391.

*Primary Examiner*—Benedict V. Safourek
*Assistant Examiner*—Andrew J. Telesz, Jr.
*Attorney, Agent, or Firm*—Kane, Dalsimer, Sullivan, Kurucz, Levy, Eisele and Richard

[57] ABSTRACT

In a communication system, a plurality of remote modems send streams of data to a local modem, each remote modem preceding its transmission with a unique preamble consisting of phase reversed signals. At the local modem a preamble decoder detects the phase reversals of received signals without requiring channel equalization and the local modem uses this information for system setup.

3 Claims, 3 Drawing Sheets

SUBRATE PREAMBLE DECODER FOR A HIGH SPEED MODEM

This is a continuation of co-pending application Ser. No. 680,377 filed on Dec. 11, 1984 and now abandoned.

BACKGROUND OF THE INVENTION

1. Field of Invention

This invention pertains to modems used for digital data exchanges and more particularly to a subrate preamble decoder for decoding information prior to channel equalization acquisition.

2. Background of the Invention

Frequently modems are used to exchange data over different channels with equalizing means which are adaptive components for the signal distortion characteristics of each of the channels. At the beginning of each data exchange the remote modem may send a preamble which contains useful information. This preamble would precede the synchronization sequence used to set up the required equalizer parameters for the current data channel being used. Inherently, the preamble decoders required presetting of the equalizer and special circuits (and techniques) had to be used to find timing edges and levels which then enabled the decoder to properly decode the preamble signal.

OBJECTIVES AND SUMMARY OF THE INVENTION

An objective of the present invention is to provide a preamble decoder which is simpler and easier to implement than the decoders used to date.

Another objective is to provide a preamble decoder which shares some of the components of the data demodulator.

Other objectives and advantages of the invention shall become apparent in the following description thereof. In some data communication systems, each data exchange could be started with a relatively short preamble preceding the normal training sequence. According to this invention the preamble consists of a plurality of phase-reversed bauds comprising a sequence selected to convey particularly useful information from a remote modem. At the local modem, the phase-reversed signals are analyzed to determine the content of information being sent in a preamble decoder.

DETAILED DESCRIPTION OF THE INVENTION

Figure 1:
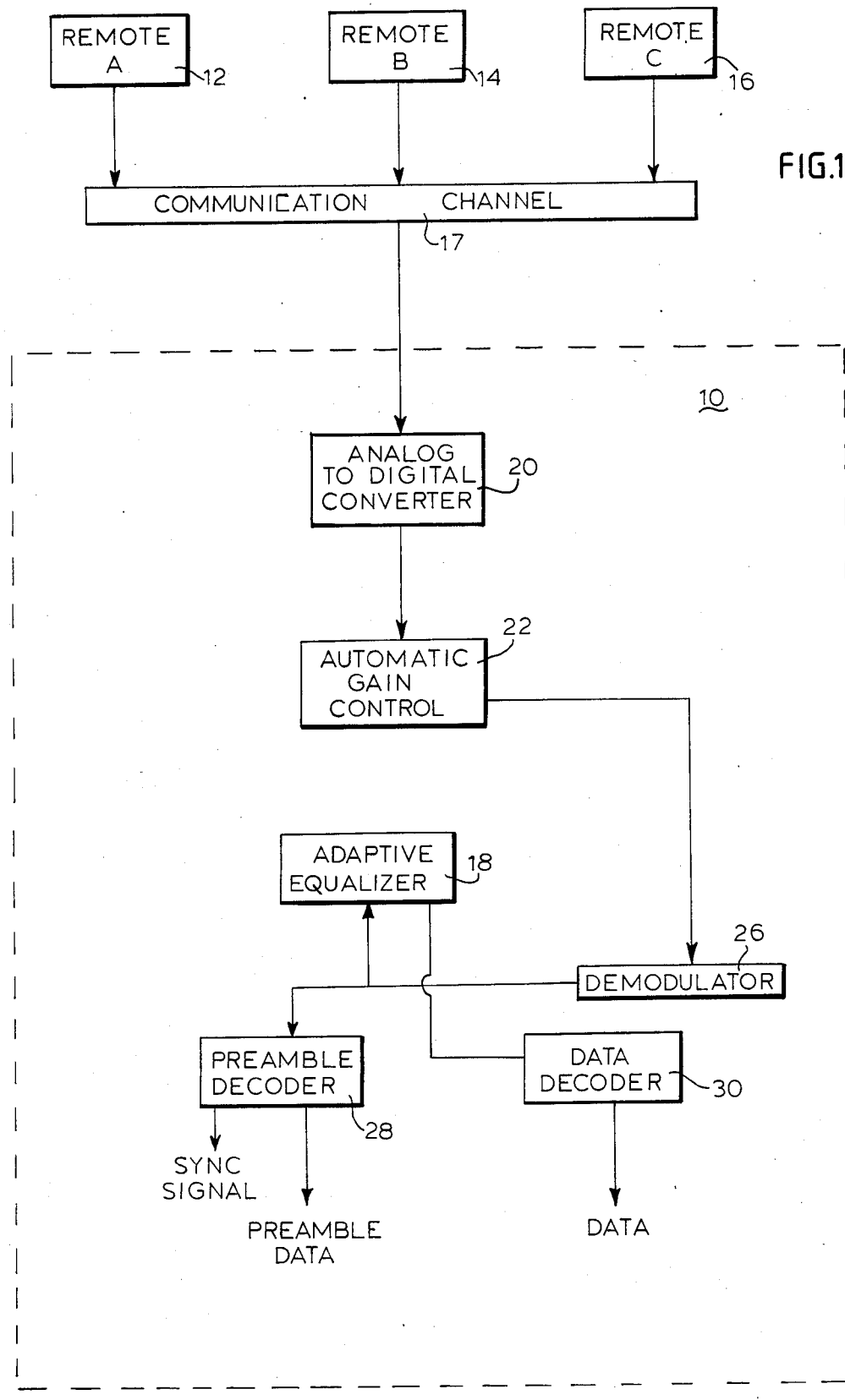
FIG. 1 shows the elements of a system constructed in accordance with this invention.

As shown in FIG. 1, data in the form of PSK/QAM modulated signals may be received by modem 10 from three different remote stations A, B, C identified respectively by numerals 12, 14, and 16 connected to a common communication channel 17. In modem 10, the signals are fed into an analog-to-digital converter 20 and automatic gain controller (AGC) 22. The signals output by the AGC are fed to a demodulator 26.

The demodulated signals from demodulator 26 are fed to the Automatic Adaptive equalizer 18 which eliminates channel distortion and the resultant signals are fed to a data decoder 30 which then generates a decoded data stream. The demodulated signals are also used by the preamble decoder circuit 28 described in more detail below.

Figure 2:
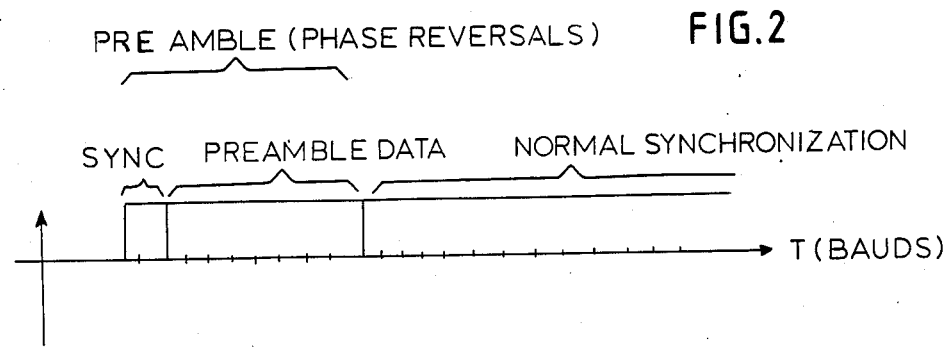
FIG. 2 shows a typical message sent from a remote modem to the local modem of the system of FIG. 1.
Figure 3:
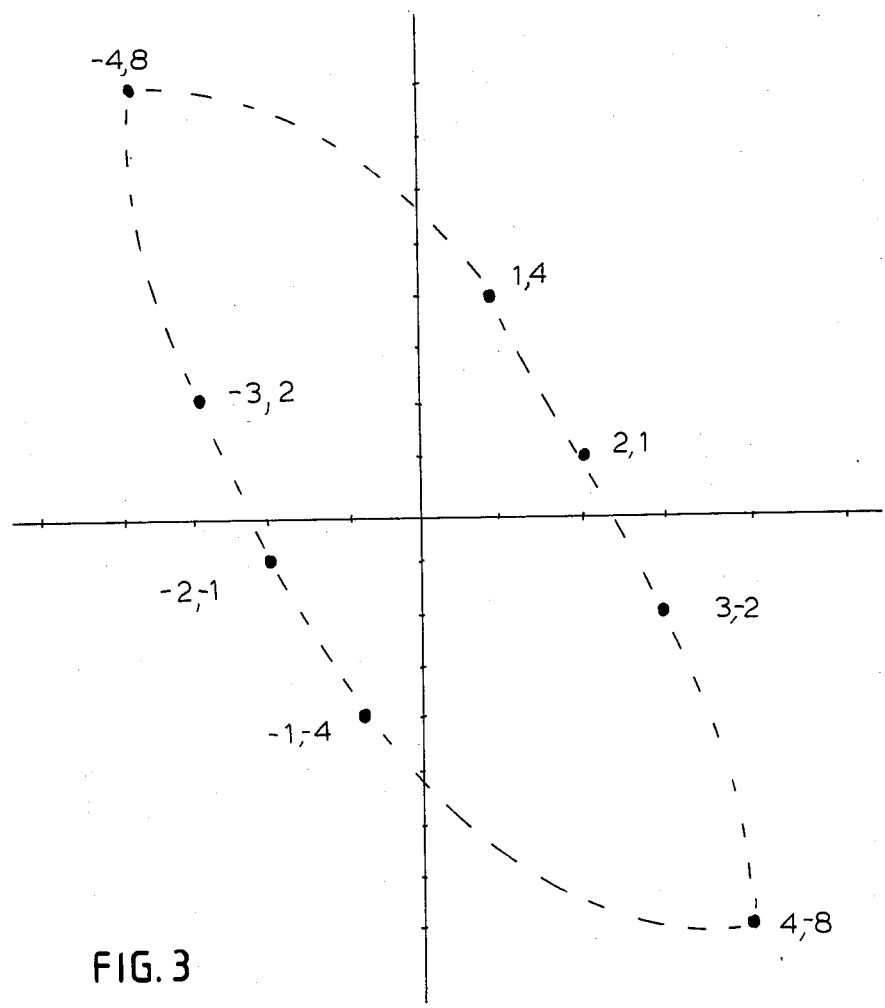
FIG. 3 shows the locus of the preamble signals of FIG. 2 in a complex plane.

A typical data stream used by the system is shown in FIG. 2. It comprises a preamble formed by sync signals and preamble information signals followed by a normal training sequence. The signals comprising the preamble are in fact a series of phase reversed symbols selected in accordance with a scheme more fully described below. During the preamble the signals are comprised of only two symbols A and B which have equal magnitude but are out of phase by 180°. Prior to equalization, these signals are defined by a pair of diametrically opposite points lying on the elliptical locus shown in complex plane of FIG. 3. For example A and B could be defined by $$A = -4 + 8j \text{ and}$$

$$B = +4 - 8j = -A$$

Figure 4:
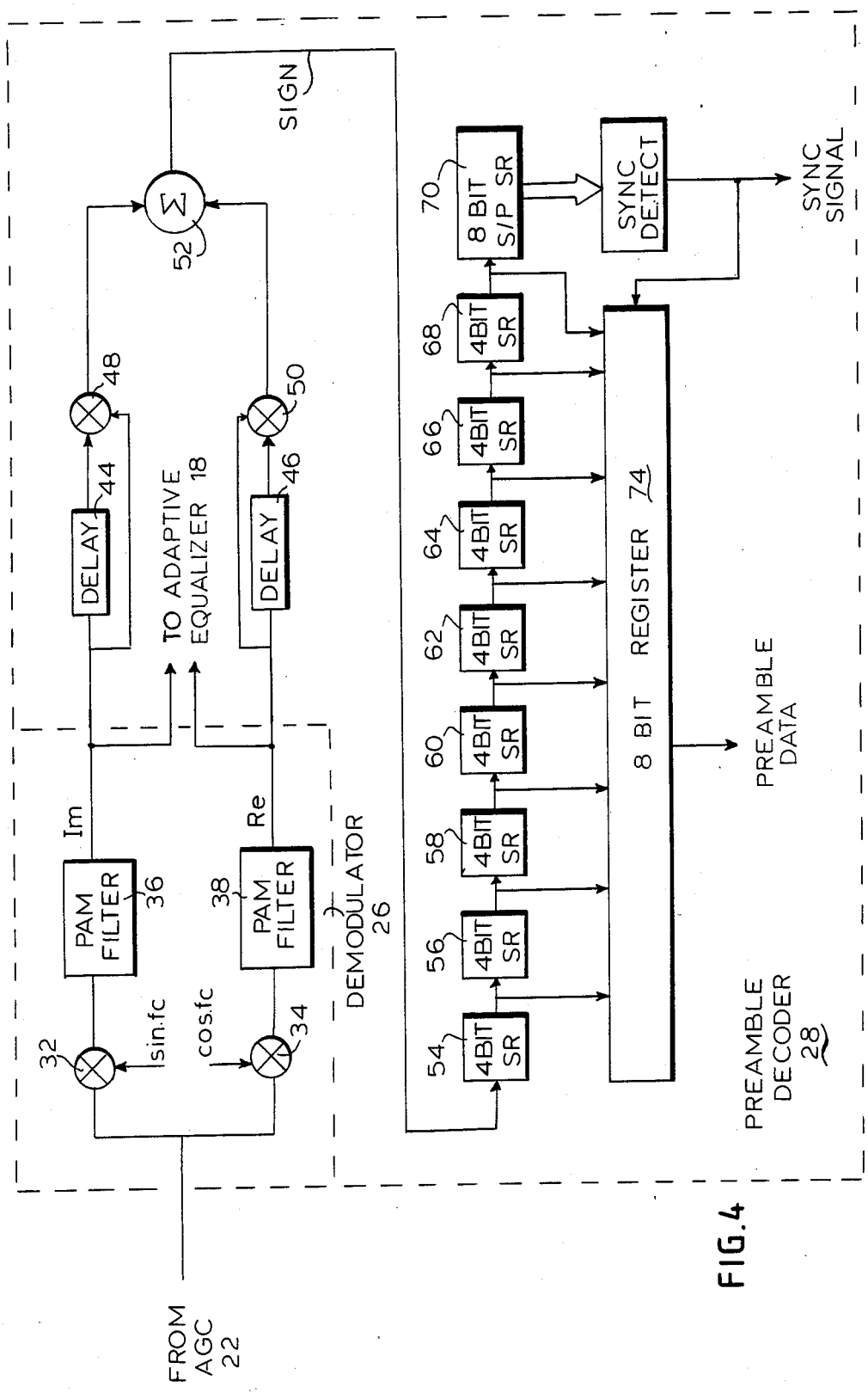
FIG. 4 shows details of the preamble decoder.

The demodulator 26 and preamble decoder 30 are shown in more detail in FIG. 4. The signals from AGC 22 are resolved into their real and imaginary components by multiplying them by the sine and cosine of the carrier frequency in multipliers 32 and 34 respectively. The multiplier filters are designated by the numerals 36 and 38.

The demodulator 26 is operated at half the ACG sample rate such as for example 4800 Hz in this case. With a baud rate of 2400 Hz the result is two samples per baud.

The outputs of the PAM filters 36, 38 are used to set adaptive equalizer 18 and are also fed to two transmitted to corresponding delay circuits 44 and 46. These delay units are provided to generate an output delayed by one baud period. The delayed outputs are multiplied by the respective PAM filter outputs as shown and the two products are summed by adder 52. The output of adder 52 consists of only the sign of the sum calculated therein. For example the output of adder 52 may be a "0" if the sum is positive and a "1" if said sum is negative. In effect delays 44, 46 multipliers, 48, 50 and adder 52 detect a phase change in the preamble. For example, if the first symbol of the preamble is A, i.e. $-4 + j\,8$ and the second preamble signal is also A then the output of adder 52 is $$\text{sign } [(-4)(-4) + (8)(8)] = \text{Sign } [80] = 0$$

On the other hand if the first signal is A and the second signal is $B = -A$, then the adder output is $\text{Sign}[(-4)(4) + (8)(-8)] = \text{Sign } [-80] = 1$. A "1" output from adder 52 indicates a phase reversal and as "0" output indicates no phase reversal.

The output of adder 52 corresponding to the preamble is fed serially into 8 serial 4-bit shift registers 54–68 and an 8 bit serial to parallel shift register 70. Since each 4 bits corresponds to one incoming signal of the preamble, the 8-bit shift register 70 contains the equivalent bits to the sync signal (see FIG. 2) while the remaining shift registers 54–68 contain the remainder of the preamble.

The contents of the shift register 70 are analyzed by a sync detector 72 which then generates a sync signal which causes the outputs of each of the other 4-bit registers 54–68 to be latched into an 8-bit parallel in, parallel out, register 74, which contains the decoded data being sent from remote modem A, B, or C.

The operation of the system can be seen from the above description. At the beginning of each transmission, each remote sends a preamble comprising a sync signal and a preselected sequence of phase-reversed signals which contain information unique to that particular remote.

Obviously numerous modifications may be made to the invention without departing from its scope as defined in the appended claims.

What is claimed is:

1. A data communication system comprising:
   a data channel;
   a plurality of remote modems for sending quadrature amplitude modulated signals over said channel, each remote modem being adapted to generate a preamble for each message, said preamble message comprising a sequence of phase reversed PSK signals having a pattern unique to each remote modem;
   a local modem coupled to said data channel for receiving said messages, said local modem including adaptive equalizer means whose parameters are set by said preamble, and preamble decoder means for decoding the preamble to generate said unique pattern before the required parameters for said adaptive equalizer are set by adjustment thereto;
   said preamble decoder means comprising a first and second multiplier for resolving said received messages respectively into their real and imaginary components and a first and a second PAM filter each connected to an output of a respective said first and second multiplier and each having an output connected to said adaptive equalizer means;
   said preamble decoder means further comprising a first and a second delay circuit each having an input connected to an output of
   a respective said first and second PAM filter, said first and second delay circuits respectively functioning to delay said real and imaginary components;
   said preamble decoder means further comprising a third and a fourth multiplier having inputs respectively connected to the outputs of said first and second delay circuits and to said outputs of said respective first and second PAM filters and functioning to multiply the respective real and imaginary outputs of said PAM filters by the outputs of said respective first and second delay circuits, and an adder having an input from each of said third and fourth multipliers , said adder functioning to output a digital signal at one discrete level if a phase reversal of said preamble message is detected and a digital signal at another discrete level if no phase reversal of said preamble message is detected.

2. The system of claim 1 wherein said preamble decoder further comprises a bit generator which generates bits corresponding to a sign of the algebraic sum of the multiplier outputs.

3. The system of claim 1 wherein said preamble decoder comprises shift register means for storing the bits generated by said bit generator means.

* * * * *